May 31, 1932.        G. D. TAYLOR        1,860,909
METHOD OF MARKING TEST SHEETS
Filed Feb. 7, 1930        2 Sheets-Sheet 1
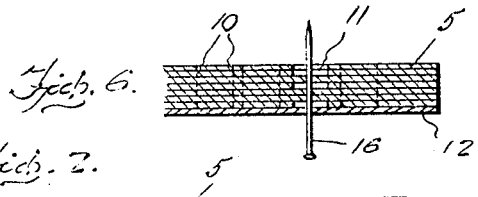
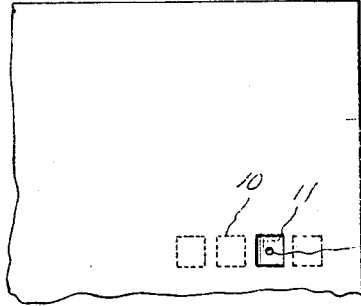
Inventor
G. D. Taylor
By Clarence A. O'Brien
Attorney May 31, 1932.  G. D. TAYLOR  1,860,909

METHOD OF MARKING TEST SHEETS

Filed Feb. 7, 1930    2 Sheets-Sheet 2

Inventor
G. D. Taylor
By Clarence A. O'Brien
Attorney

Patented May 31, 1932

1,860,909

UNITED STATES PATENT OFFICE

GEORGE DUEY TAYLOR, OF MONTICELLO, KENTUCKY

METHOD OF MARKING TEST SHEETS

Application filed February 7, 1930. Serial No. 426,655.

The present invention relates to educational devices and has particular reference to a correction sheet by means of which a large number of work sheets or papers of students may be simultaneously corrected.

The invention resides essentially in the provision of a work sheet having means indicated thereon whereby the student may indicate his answer to a stated problem and a correction sheet which may be placed under a stack of the work sheets and upon which the correct answer is indicated in a position immediately beneath the indicated answers of the work sheets so that upon passing a pointed object through the entire stack of sheets it will appear whether the correct answers have been indicated, by the position of the perforations made.

One of the important objects of the present invention is to provide a correction sheet of the aforementioned character which greatly simplifies the steps required in correcting a large number of papers and which is at the same time accurate and otherwise well adapted for the purposes for which it is intended.

Other objects and advantages reside in the special construction, combination and arrangement of the various elements forming the invention as more fully hereinafter described and claimed, reference being had to the accompanying drawings forming part hereof, wherein like numerals refer to like parts throughout, and in which:

Figure 1 is a plan view of the work sheet,

Figure 2 is an edge elevation of a stack of the work sheets,

Figure 3 is a plan view of the test or correction sheets,

Figure 4 is a fragmentary plan view of the rear of the correction sheet,

Figure 5 is a fragmentary plan view of the front side of one of the work sheets showing the manner in which a portion thereof may be perforated to indicate the answer given by the pupils, Figure 6 is a transverse sectional view through a stack of the work sheets superimposed upon the correction sheet and illustrating the manner in which the pin or other object may be inserted through the entire stack of sheets, and Figure 7 is a fragmentary top plan view of one of the work sheets after the pin has been removed.

Referring now to the drawings in detail for the purpose of illustration I have disclosed a preferred embodiment of the invention which includes a work sheet designated by the numeral 5 upon which a series of problems 6 has been written or printed and at the end of which has been placed a group of suggested answers 7, each answer being designated by suitable indicia 8, such as the numbers 1, 2, etc.

Immediately beneath the problem and adjacent one side edge of the sheet is printed or written a group of indicia 9 corresponding to the indicia 8 appearing at the end of the problems. The indicia 9 are surrounded by perforations 10 by means of which the section of the sheet upon which the indicia 9 are placed may be readily punched out.

Through these provisions the student may indicate his selected answer by punching out the portion of the sheet bearing the indicia or number corresponding to the suggested answer appearing at the end of the problem. It is to be understood also that the sheet may be provided with other means for indicating the answer, such as the conventional punch board method of providing openings in the sheet over which a thin sheet of paper is pasted bearing the desired indicia, which openings may be punched out with the aid of a pencil or the like.

After the answer has been selected on the work sheet by punching out proper portions of the sheet to form the openings 11, the work sheets are then stacked and placed upon the correction or test sheet 12. In order to insure the accurate stacking of the sheets upon the correction sheet, openings 13 may be formed adjacent one edge of the respective sheets for alining them with each other whereby to indicate the correct stacking of the sheets.

The correction sheet 12 is also provided with indicia 14 corresponding to the indicia 9 carried by the work sheet and arranged on the correction sheet in a corresponding position so that when the sheets are placed in superposed relation the indicia 9 of the work sheet will register with the indicia 14 of the correction sheet.

The back of the correction sheet is likewise provided with indicia 15 corresponding with the indicia 14 of the correction sheet and positioned in the same relative position on the sheet so that when the sheet is turned over the exact position of the indicia 14 on the front side of the sheet will be apparent.

After the work sheets have been stacked, with the correction sheet underneath, a pointed object 16 may be inserted through the stacked sheets at the proper place corresponding to the indicia indicating the correct answer to the problem. Should the respective work sheets have been punched to indicate the correct answer, the object 16 will pass through the holes thus made in the work sheet.

However should an incorrect answer have been indicated the object will penetrate the work sheet at the point where the opening should have been formed and by the pressure of the object, or opening made by the penetration thereof the fact of the designation of an incorrect answer will be indicated.

It will be obvious that a large number of work sheets may be simultaneously corrected through the use of the invention.

Having thus described my invention, what I claim as new is:

In a method for indicating the absence of a correct answer or answers in a test sheet bearing indicia indicating questions and a set of a plurality of possible answers for each question, one answer of each set being correct and the others incorrect, and wherein the indications for the respective correct answers are to be punched out by the person taking the test, the steps first of aligning one or more sheets after the test has been completed with a template having apertures corresponding to, and aligned with, the respective indications of correct answers and then running an instrument through the apertures of said template and through said sheet or sheets in alignment with said apertures, whereby any correct answer indication not punched out by the pupil may be perforated by said instrument.

In testimony whereof I affix my signature.

GEORGE DUEY TAYLOR.